(12) United States Patent
Schultheis et al.

(10) Patent No.: US 11,428,565 B2
(45) Date of Patent: Aug. 30, 2022

(54) DEVICE AND METHOD FOR CAPACITIVELY MEASURING A FILL LEVEL OF A FILLING MEDIUM

(71) Applicant: BEDIA MOTORENTECHNIK GMBH & CO. KG, Altdorf (DE)

(72) Inventors: Holger Schultheis, Altdorf bei Nürnberg (DE); Georg Kodl, Nuremberg (DE)

(73) Assignee: BEDIA MOTORENTECHNIK GMBH & CO. KG

( * ) Notice: Subject to any disclaimer, the term of this patent is extended or adjusted under 35 U.S.C. 154(b) by 131 days.

(21) Appl. No.: 16/754,052

(22) PCT Filed: Oct. 8, 2018

(86) PCT No.: PCT/EP2018/077360
§ 371 (c)(1),
(2) Date: Apr. 6, 2020

(87) PCT Pub. No.: WO2019/096493
PCT Pub. Date: May 23, 2019

(65) Prior Publication Data
US 2021/0372841 A1    Dec. 2, 2021

(30) Foreign Application Priority Data

Nov. 17, 2017 (DE) ............... 10 2017 127 145.7

(51) Int. Cl.
*G01F 23/263* (2022.01)

(52) U.S. Cl.
CPC ................ *G01F 23/263* (2013.01)

(58) Field of Classification Search
CPC ....... G01F 23/26; G01F 23/263; G01F 23/265
See application file for complete search history.

(56) References Cited

U.S. PATENT DOCUMENTS

| | | | |
|---|---|---|---|
| 3,901,079 A | 8/1975 | Vogel | |
| 5,747,689 A * | 5/1998 | Hampo | G01F 23/265 702/55 |
| 6,564,630 B1 * | 5/2003 | Klemp | G01F 23/266 73/290 R |
| 2010/0295565 A1 * | 11/2010 | Drack | G01M 3/3245 324/693 |
| 2012/0240675 A1 | 9/2012 | Farmanyan | |
| 2014/0352428 A1 * | 12/2014 | Kato | G01F 23/268 73/304 C |
| 2017/0120616 A1 | 5/2017 | Michallon | |

FOREIGN PATENT DOCUMENTS

| | | |
|---|---|---|
| CN | 1690670 A | 11/2005 |
| CN | 103557904 A | 2/2014 |
| DE | 3127637 A1 | 3/1982 |

\* cited by examiner

*Primary Examiner* — Justin N Olamit
(74) *Attorney, Agent, or Firm* — Rimon, P.C.

(57) ABSTRACT

Device and related methods for capacitive measurement of a filling level of a filling medium in a filling volume that can be filled with a filling medium utilizing tailored voltage application and control.

13 Claims, 4 Drawing Sheets

DEVICE AND METHOD FOR CAPACITIVELY MEASURING A FILL LEVEL OF A FILLING MEDIUM

CROSS-REFERENCE TO RELATED APPLICATIONS

Figure 1:
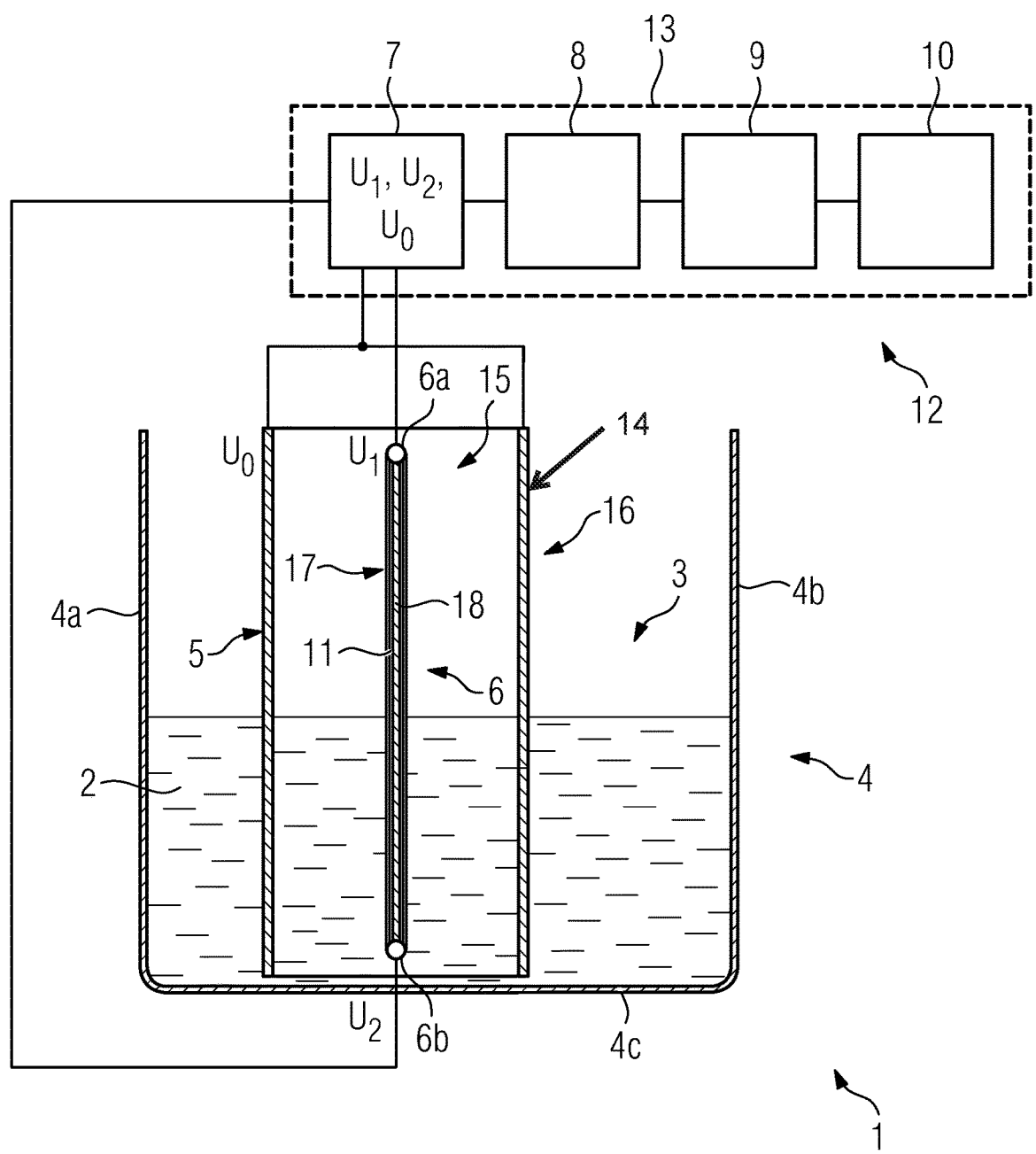

This application claims priority to Patent Cooperation Treaty application serial number PCT/EP2018/077360, filed Oct. 8, 2018, which claims priority to German patent application serial number 10 2017 127 145.7, filed Nov. 17, 2017, the contents of each of which are incorporated herein by reference in their entirety.

The invention relates to a device and method for capacitive measurement of a filling level of a filling medium in a filling volume that can be filled with a filling medium.

Devices and methods for capacitive measurement of a filling level of a filling medium in a filling volume that can be filled with a filling medium are known in principle. Corresponding devices and methods are based on the principle of evaluating the electrical capacitance of a measuring element of a measuring device arranged in a filling volume filled with the filling medium, which changes depending on the filling level of a filling medium.

Hitherto, in corresponding devices or methods it is typically the case that the filling level to be measured is derived (directly) from the electrical capacitance that changes depending on the filling level. In this case, the filling medium typically forms a dielectric of an electrical capacitor, and the electrodes of the capacitors are typically formed by measuring elements of the measuring device. In this case, the complex relative permittivity (referred to, for short, in the following as permittivity) of the filling medium, the real part of which reflects the dielectric constant of the filling medium, and the imaginary part of which reflects the (specific) electrical conductivity of the filling medium, must be known, in order for it to be possible to measure the filling level.

In order to be able to also carry out a filling level measurement when the permittivity of the filling medium is unknown, sometimes two capacitances are provided which are dependent in different manners on the filling level and the permittivity of the filling medium. Considered mathematically, two linearly independent systems are provided. Another approach consists in providing a reference measuring element that serves specifically for determining the permittivity constant of the filling medium. Therefore, in this approach, a further measuring element is to be provided, which element constitutes the actual measuring element for measuring the filling level.

The approaches described are in need of improvement in particular because the measuring devices required therefor must comprise more electrical capacitors which, in particular owing to a required "decoupling" of the electrical capacitors, generally results in measuring devices of a relatively complex design. In addition, measuring devices comprising reference measuring elements often allow for only a limited measurement, between and minimum and a maximum filling level.

The object of the invention is that of providing a comparatively improved device for capacitive measurement of a filling level of a filling medium in a filling volume that can be filled with a filling medium.

The object is achieved by a device according to claim 1. The claims dependent thereon relate to possible embodiments of the device.

The device described herein (referred to for short in the following as "device") is generally used for capacitive measurement of a filling level of a filling medium in a filling volume that can be or is filled with a filling medium, and is accordingly designed for capacitive measurement of a filling level of a filling medium in a filling volume that can be or is filled with a filling medium.

The filling medium of which the filling level is to be measured using the device can be electrically conductive or electrically non-conductive. The filling medium is typically, but not necessarily, a fluid; the term "filling medium" therefore in principle also includes gasses and solids.

A filling medium in the form of a fluid can in particular be an operating fluid, i.e. for example a fuel, of a machine, in particular a motor, for example of an engine, or comprise an operating fluid of this kind. In this case, the device can be used as, and accordingly denoted or considered as, a filling level sensor of a motor, in particular of an engine.

The fillable or filled filling volume, the filling level of which is to be measured using the device, is typically defined by the geometric/structural dimensions of a container or receptacle that is of the filling volume. Accordingly, the filling medium of which the filling level is to be measured using the device is located in a container or receptacle. A corresponding container or receptacle may for example be a tank.

The device comprises the parts or components that will be described in the following and that interact in order to determine the filling level:

A first component of the device is a first measuring element. The first measuring element can also be referred to as or considered to be the first measuring electrode. As is clear in the following, the first measuring element can form or be used as a first electrode of a capacitor assembly formed by the first measuring element and a second measuring element of the device. The first measuring element typically exhibits electrically conductive properties. The first measuring element is accordingly typically formed of an electrically conductive material, e.g. metal, or comprises an electrically conductive material.

A further component of the device is a second measuring element. The second measuring element can also be referred to as or considered to be the second measuring electrode. As is clear in the following, the second measuring element can form or be used as a second electrode of a capacitor assembly formed by the first measuring element and a second measuring element. In contrast or in comparison to the first measuring element, the second measuring element typically has reduced or significantly reduced electrically conductive properties. Accordingly, in contrast or in comparison to the first measuring element, the second measuring element is typically formed of an in particular significantly less electrically conductive material or an in particular significantly less electrically conductive material structure, or comprises an in particular significantly less electrically conductive material or an in particular significantly less electrically conductive material structure.

During operation of the device, the two measuring elements are typically arranged in the filling volume at least in portions, or, depending on the filling level, immersed in the filling medium at least in portions.

The two measuring elements are typically arranged or formed so as to be adjacent. The adjacent arrangement or formation of the two measuring elements is typically selected such that the first and the second measuring element form a capacitor assembly or a capacitor. In this case, the first measuring element forms a first electrode of the capacitor assembly or of the capacitor, and in this case the second measuring element forms a second electrode of the capacitor assembly or of the capacitor. A clearance or gap is formed between the two measuring elements, which clearance or gap can be or is filled with the filling medium, according to the filling level, i.e. in a manner dependent on the filling level.

The first and/or the second measuring element can be formed in a segmented manner, i.e. can comprise a plurality of measuring element segments that form the first and/or second measuring element. In the event of the first measuring element being formed by a plurality of measuring element segments forming the first measuring element or comprising a plurality of measuring element segments forming the first measuring element, and/or the second measuring element being formed by a plurality of second measuring element segments forming the second measuring element, or comprising a plurality of first measuring element segments forming the first measuring element, the relevant first and second measuring element segments are typically arranged such that the arrangement thereof in turn can form or forms a capacitor assembly or a capacitor.

The geometric/structural design of the first measuring element or of the second measuring element can in principle be selected as desired, provided that the first measuring element and the second measuring element form a capacitor assembly or a capacitor. Typically the two measuring elements are in each case formed in an elongate manner, such that said elements each comprise a distinct longitudinal axis. Therefore, any desired geometric/structural arrangements of the first and second measuring element are conceivable, provided that the first measuring element and the second measuring element form a capacitor assembly or a capacitor. The first measuring element can be designed for example so as to be plate-like or planar, or tube-like or tubular. The second measuring element can be designed for example so as to be plate-like or planar, or rod-like or rod-shaped.

A first measuring element that is designed for example so as to be plate-like or planar, or tube-like or tubular, can form an optionally integral part of a housing structure of the device that receives the first and/or the second measuring element. The second measuring element that is designed for example so as to be plate-like or planar, or rod-like or rod-shaped, can be received in a housing structure of the device that receives the first and the second measuring element. In this case, in the event of plate-like or planar embodiments of the first a second measuring element, for example parallel arrangements thereof are conceivable. In the case of tube-shaped or tubular embodiments of the first measuring element and rod-shaped or rod-like embodiments of the second measuring element, for example a coaxial arrangement thereof is conceivable.

Respective measuring elements can also be formed by specified more or less electrically conductive structures, in particular on a substrate element such as a circuit board. Electrically conductive structures (first electrically conductive structures) having higher electrical conductivity can form the first measuring element, and electrically conductive structures (second electrically conductive structures) having a comparatively (significantly) lower electrical conductivity can form the second measuring element. In this connection, what is known as an interdigital arrangement or structure is conceivable. Accordingly, respective first and second electrically conductive structures can be designed so as to be arranged in a manner so as to be mutually offset, in parallel, so as to engage in one another in a finger-like manner. In this case, the arrangement of respective first and second electrically conductive structures can be selected such that a first electrically conductive structure, in each case, is arranged or designed so as to engage in the gap that is formed between two (directly) adjacent second electrically conductive structures, at least in regions.

The second measuring element is created such that (during operation of the device) a potential gradient, i.e. a gradient of an electrical potential, is formed between a first portion of the second measuring element, i.e. in particular a first free end of the second measuring element, and a second portion of the second measuring element, i.e. in particular a second free end of the second measuring element that is located opposite the first free end of the second measuring element. As a result, the first portion of the second measuring element can be formed in the region of a first free end of the second measuring element or by a first free end of the second measuring element, and/or the second portion of the second measuring element can be formed in the region of a second free end of the second measuring element or by a second free end of the second measuring element. The potential gradient formed between said portions of the second measuring element is typically independent of the filling level of the filling medium. The measuring region of the second measuring element typically extends between said portions of the second measuring element.

The second measuring element can be designed as a measuring resistor, or can comprise at least one such resistor. Accordingly, the formation of the potential gradient between said portions of the second measuring element can be based on the second measuring element being designed as a measuring resistor, or comprising at least one such resistor. The resistance (value) of the measuring resistor is sufficiently large that a corresponding potential gradient can be or is formed between said portions of the second measuring element.

A further component of the device is a voltage generation means that is associated with the second measuring element, i.e. can be or is in particular electrically connected to the second measuring element. The voltage generation means is designed to provide or generate a first electrical voltage and a second electrical voltage, and apply these to the second measuring element. In order to provide or generate respective electrical voltages, the voltage generation means can be connected to an internal or external voltage (supply) source, i.e. for example a voltage supply network. The first electrical voltage can (in terms of magnitude) be the same as the second electrical voltage. The first electrical voltage can, however, optionally also be different (in terms of magnitude) from the second electrical voltage, or vice versa. Therefore, the voltage generation means can optionally be designed to generate at least two identical or different electrical voltages.

In order to apply respective first and second electrical voltages to the second measuring element, the second measuring element can comprise separate voltage application regions, i.e. for example electrical contacts, at which the electrical voltages provided or generated by the voltage generation means can be or are applied. A first voltage application region can be formed by or arranged in the region of the above-mentioned first portion, i.e. in particular in the region of a first free end, of the second measuring element, and a second voltage application region can be formed by or arranged in the region of the above-mentioned second portion, i.e. in particular in the region of a second free end of the second measuring element.

The electrical voltages provided or generated by the voltage generation means can each be provided or generated in the form of a voltage pulse that is defined, in particular in terms of magnitude and time. Accordingly, the voltage generation means can be designed to provide or generate defined voltage pulses. A correspondingly designed voltage generation means can for example be designed as a pulse generator, or can comprise such a pulse generator. A first voltage pulse can be the same as a second voltage pulse. A first electrical voltage pulse can, however, optionally also be different (in terms of magnitude) from a second electrical voltage pulse, or vice versa. Therefore, the voltage generation means can optionally be designed to generate at least two identical or different electrical voltage pulses.

A further component of the device is a control means that is implemented as hardware and/or software and is associated with the voltage generation means. The control means can form a part of the voltage generation means that is implemented as hardware and/or software. The control means is designed to control the operation of the voltage generation means such that the first and second electrical voltage can be or is applied in an alternating manner to the second measuring element, i.e. in particular to respective first and second voltage application regions of the second measuring element. Alternating application or presence of the first and second electrical voltage on the second measuring element, i.e. the respective voltage application regions of the second measuring element, is in particular to be understood to mean that electrical voltages or voltage pulses that are defined (in terms of magnitude) are applied to respective voltage application regions of the second measuring element in an alternating manner. In this case, either the first voltage is applied to the first voltage application region of the second measuring element, while the second voltage is applied to the second voltage application region of the second measuring element, or the second voltage is applied to the first voltage application region of the second measuring element, while the first voltage is applied to the second voltage application region of the second measuring element.

The control means is accordingly designed to control the operation of the voltage generation means such that the first electrical voltage and the second electrical voltage are applied in an alternating manner to the second measuring element, i.e. to respective voltage application regions of the second measuring element. Accordingly, in a first time interval the first electrical voltage, and in a following second time interval the second electrical voltage is thus applied to the first voltage application region of the second measuring element, while in the first time interval the second electrical voltage, and in the following second time interval the first electrical voltage is applied to the second voltage application region of the second measuring element, or vice versa. In a following third time interval the first electrical voltage is again applied to the first voltage application region of the second measuring element, while the second electrical voltage is again applied to the second voltage application region of the second measuring element, and so on.

An improved principle for capacitive measurement of a filling level of a filling medium in a filling volume that can be or is filled by a filling medium can be implemented by means of a device that is designed in this way. As can be seen in the following, the principle for capacitive filling level measurement that can be implemented using the device is based in particular on detection and evaluation of the electrical charge or electrical capacitance between the first and the second measuring element, which varies depending on the filling level of the filling medium, from which measurement the filling level of the filling medium can be concluded and this can thus be determined.

In this case, the second measuring element typically functions as a filling level-independent voltage divider which generates a potential gradient along the second measuring element or along the measuring region of the second measuring element. The filling level-independent voltage division along the second measuring element or along the measuring region of the second measuring element results in a filling level-dependent weighting of the electrical charge or capacitance between the first and the second measuring element. The electrical charge between the first and the second measuring element is in particular dependent on the filling level of the filling medium, the potential along the potential gradient, and the permittivity of the filling medium which, as mentioned, is to be understood as the complex relative permittivity of the filling medium, the real part of which reflects the dielectric constant of the filling medium and the imaginary part of which reflects the (specific) electrical conductivity of the filling medium, but which is not relevant, and can therefore be disregarded, for the determination of the filling level that is to be or can be performed using the device. Accordingly, the determination of the filling level that is to be or can be performed using the device is possible independently of the permittivity of the filling medium, i.e. also without determining the permittivity of the filling medium.

The device can furthermore comprise a measuring device that is implemented as hardware and/or software. The measuring device is designed for measuring the, possibly changing, electrical charge or electrical capacitance between the first and second measuring element during the alternating application or presence of the first and second electrical voltage on the second measuring element, i.e. in particular on the respective first and second voltage application regions of the second measuring element. The measuring device is thus designed to measure a first electrical charge between the first and second measuring element during application of the first electrical voltage to the first voltage application region of the second measuring element and while the second electrical voltage is applied to the second voltage application region of the second measuring element, and to measure a second electrical charge between the first and second measuring element during application of the second electrical voltage to the first voltage application region of the second measuring element and during application of the first electrical voltage to the second voltage application region of the second measuring element.

Typically, the measuring device is furthermore designed for generating a measuring signal that describes the measured charge between the first and the second measuring element during the alternating application or presence of the first and second electrical voltage on the voltage application regions of the second measuring element. The measuring signal can contain at least two partial signals, wherein a first partial signal describes the electrical charge between the first and second measuring element during application of the first electrical voltage to the first voltage application region of the second measuring element and during application of the second electrical voltage to the second voltage application region of the second measuring element, and a second partial signal describes the electrical charge between the first and second measuring element during application of the second electrical voltage to the first voltage application region of the second measuring element and application of the first electrical voltage to the second voltage application region of the second measuring element.

The device can furthermore comprise an evaluation device that is implemented as hardware and/or software. The evaluation device can be associated with the measuring device. The evaluation device is designed for evaluating the measured charge during the alternating application or presence of the first and second electrical voltage on the second measuring element, i.e. in particular on the respective voltage application regions of the second measuring element, or for evaluating said measuring signal in view of the filling level of the filling medium in the filling volume. In order to evaluate the measured charge or the measuring signal, the evaluation device can comprise suitable evaluation logics or suitable evaluation algorithms.

The second measuring element which, as mentioned, is typically designed so as to be elongate, can, as also mentioned, be designed as a measuring resistor, or can comprise at least one such resistor.

The measuring resistor can be designed for example as a resistance element that is arranged or formed so as to extend continuously along the longitudinal axis of the second measuring element, in particular on a substrate element of the second measuring element, which substrate element may for example be a circuit board. An equivalent circuit diagram for a first measuring element and a corresponding second measuring element that is designed as a measuring resistor or resistance element constitutes an RC chain with an "infinite" number of RC elements.

It is alternatively also conceivable for the measuring resistor to be formed by a plurality of discrete, electrically conductive, in particular metal, surface elements that are arranged or formed along the or a longitudinal axis of the second measuring element on a substrate element of the second measuring element, which substrate element may, as mentioned, be a circuit board, said surface elements each being connected to discrete resistance elements and to the voltage application regions of the second measuring element. In this case, there is typically an alternating arrangement of corresponding surface elements and corresponding resistance elements. An equivalent circuit diagram for a first measuring element and a correspondingly designed second measuring element displays a plurality of discrete capacitive surfaces that are connected by means of electrical resistors.

In general terms, it is therefore the case that the measuring resistor is typically elongate, i.e. extends in the longitudinal direction of the second measuring element, at least in portions.

Whatever the specific design, e.g. even in the case of coating of a substrate element at least in portions, and possibly completely, which substrate element can, as mentioned, be a circuit board, the measuring resistor, and thus the second measuring element, can be made of a suitable material. The coating can extend continuously or discontinuously between said portions of the second measuring element (in the longitudinal direction of the second measuring element). The coating can be achieved by means of various, in particular chemical and/or physical, deposition or application or coating techniques which allow for material application that forms a coating. Merely by way of example, reference is made to deposition, vapor deposition or imprinting.

The second measuring element can (in addition) comprise, at least in portions, in particular fully, an insulation coating, made of a suitable insulation material, such as plastics material, which forms an electrical insulation of the second measuring element. The second measuring element can be insulated from the filling medium in this manner; i.e. there is no electrical contact between the filling medium and the second measuring element. Insulation of the second measuring element that is achieved by a corresponding insulation coating is typically necessary only when using the device in conjunction with electrically conductive filling media. Accordingly, the insulation coating is in principle optional.

In addition to the device, the invention also relates to a measuring assembly for capacitive measurement of a filling level of a filling medium in a filling volume that can be filled with a filling medium, in particular for a device as described. The measuring assembly comprises a measuring element (which, together with the device forms a second measuring element of the device) which is created such that a potential gradient forms between a first portion, i.e. typically a first voltage application region, of the second measuring element, and a second portion, i.e. typically a second voltage application region of the second measuring element; a voltage generation means that is associated with the second measuring element and which is designed to generate a first electrical voltage and a second electrical voltage which is optionally different from the first electrical voltage, and to apply said voltages alternately to the second measuring element; as well as a control means which is associated with the voltage generation means and is designed to control the operation of the voltage generation means such that the first and second electrical voltage is applied alternately to the first and the second portion of the second measuring element.

The measuring assembly may further comprise a measuring device which is designed for measuring the electrical charge between the first and second measuring element during the alternating application of the first and second electrical voltage to the first and the second portion of the second measuring element, and an evaluation device which is associated with the measuring device and is designed for evaluating the measured electrical charge during the alternating application of the first and second electrical voltage to the second measuring element, i.e. in particular to the respective voltage application regions of the second measuring element, in view of the filling level of the filling medium in the filling volume.

Individual ones, a plurality, or all of the parts of the measuring assembly can be combined, structurally, to form an assembly that can be handled separately, i.e. for example arranged or formed on or in a housing body of the measuring assembly.

All the statements made in connection with the device apply analogously to the measuring assembly.

In addition to the device and the measuring assembly, the invention also relates to a method for capacitive measurement of a filling level of a filling medium in a filling volume that can be or is filled with a filling medium. The method comprises in particular the following steps:
  providing a first measuring element,
  providing a second measuring element, wherein the second measuring element is created such that a potential gradient forms between a first portion, in particular a first voltage application region, of the second measuring element, and a second portion, in particular a second voltage application region, of the second measuring element;
  providing or generating a first electrical voltage and/or a second electrical voltage that is optionally different from the first electrical voltage;
  applying the generated first and second electrical voltage alternately to the first and second portion of the second measuring element,
  measuring the charge between the first and second measuring element during the alternating application or presence of the first and second electrical voltage on the second measuring element, evaluating the measured charges during the alternating application or presence of the first and second electrical voltage on the second measuring element, in view of the filling level of the filling medium in the filling volume.

The method be implemented in particular using a device as described; all the statements made in connection with the device apply analogously to the method.

Figure 2:
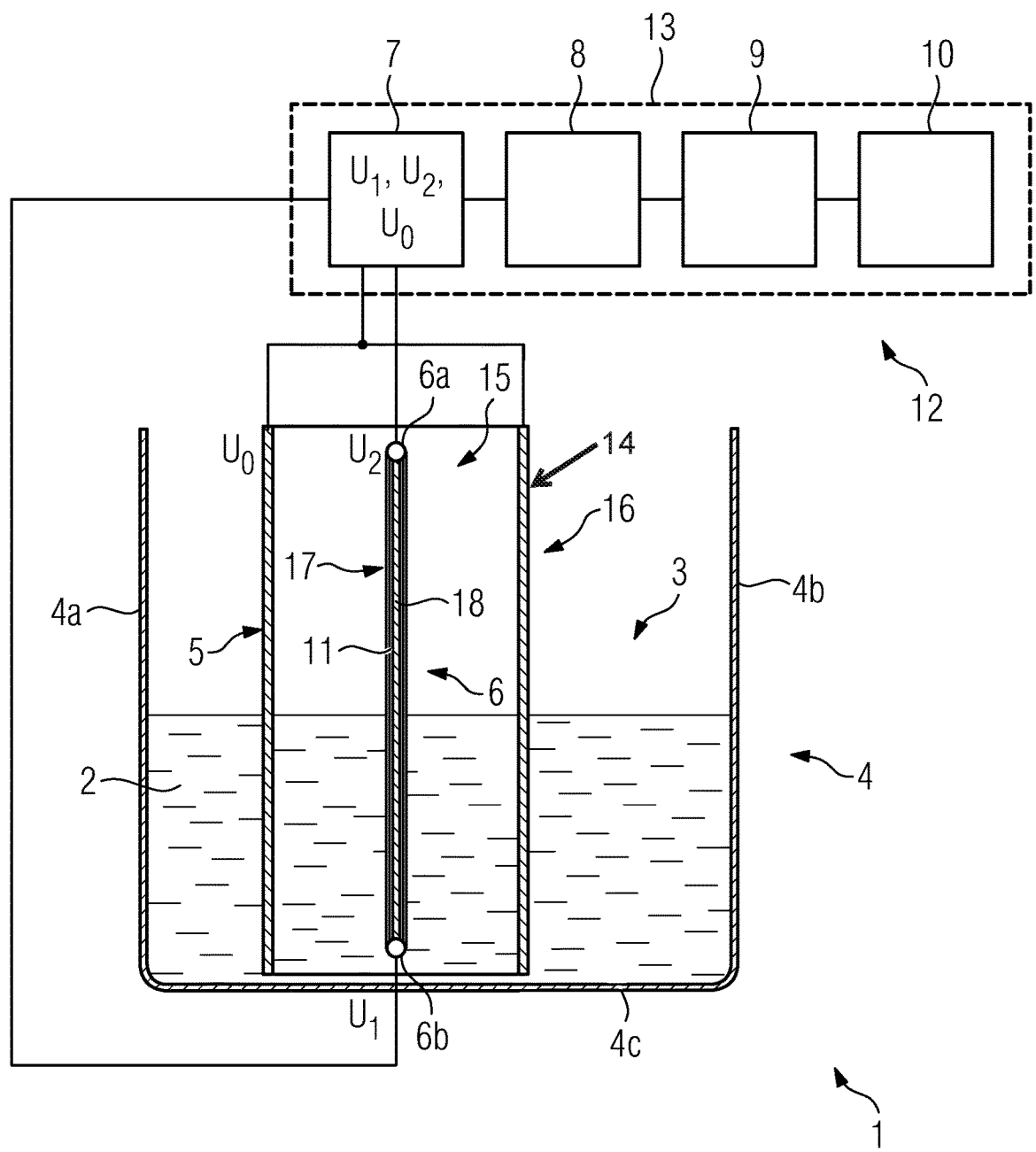

The invention will be explained in greater detail in the following, with reference to embodiments shown in the drawings, in which:

FIGS. 1 and 2 are each schematic views of a device for capacitive measurement of a filling level in a filling volume that can be or is filled with a filling medium, according to an embodiment; and FIG. 3-6 are each schematic views of measuring elements according to a further embodiment.

FIGS. 1 and 2 are each schematic views of a device 1 for capacitive measurement of a filling level in a filling volume 3 that can be or is filled with a filling medium 2, according to an embodiment. The filling volume 3 is formed by the geometric/structural dimensions of a receptacle 4, i.e. in particular by the walls or wall portions 4a-4c of the receptacle 4.

In the embodiment, the filling medium 2 is a fluid, i.e. for example a fuel. Therefore, by way of example, in the embodiment the receptacle 4 is a tank. The walls of the receptacle 4 are denoted 4a-4c.

The device 1 comprises two measuring elements 5, 6 which are described in greater detail in the following.

In the embodiment, a first measuring element 5 which is also to be denoted or referred to as a first measuring electrode, is formed, by way of example, by a wall of a housing structure 14 of the device 1. The first measuring element 5 is electrically conductive or exhibits electrically conductive properties; accordingly, the first measuring element 5 is formed of an electrically conductive material, e.g. metal. The potential of the first measuring element 5 is denoted $U_0$.

In the operating state of the device 1, shown in the figure, a second measuring element 6 which is also to be denoted or referred to as a second measuring electrode, is arranged so as to be adjacent to the first measuring element 5. Accordingly, the second measuring element 6 is received in or within a receiving space 15 formed by the housing structure 14 of the device 1.

The two measuring elements 5, 6 are each designed so as to be elongate and are arranged in parallel, i.e. the respective longitudinal axes (not shown) of the two measuring elements 5, 6 are oriented so as to be in parallel.

It is clear that the two measuring elements 5, 6 are arranged side-by-side, such that the two measuring elements 5, 6 form a capacitor assembly 16 or a capacitor. In this case, the first measuring element 5 forms a first electrode of the capacitor assembly 16, and in this case the second measuring element 6 forms a second electrode of the capacitor assembly 16. A clearance or gap (cf. receiving space 15) is formed between the two measuring elements 5, 6, which clearance or gap can be or is filled with the filling medium 2, according to the filling level, i.e. in a manner dependent on the filling level.

It is clear that the two measuring elements 5, 6 are arranged in the filling volume 3, or, depending on the filling level, immersed in the filling medium 2 at least in portions.

The second measuring element 6 is (significantly) less electrically conductive in contrast or in comparison to the first measuring element 5, or has (significantly) reduced electrically conductive properties in contrast to the first measuring element 5. Accordingly, in contrast or in comparison to the first measuring element 5, the second measuring element 6 is formed of a (significantly) less electrically conductive material or a (significantly) less electrically conductive material structure.

A shown in FIGS. 1 and 2, the second measuring element 6 can comprise an (optional) insulation coating 17 or be surrounded by such a coating. The insulation coating 17 can be omitted if the filling medium 2 is not electrically conductive; therefore, the insulation coating 17 is in principle optional.

The second measuring element 6 is created such that, during operation of the device 1, a potential gradient, i.e. a gradient of an electrical potential, is formed between a first portion 6a of the second measuring element 6, i.e. in particular a first free end of the second measuring element 6, and a second portion 6b of the second measuring element 6, i.e. in particular a second free end of the second measuring element 6 that is located opposite the first free end of the second measuring element 6. In the embodiment shown in the figures, the first portion 6a of the second measuring element 6 is formed in the region of the first free end of the second measuring element 6 or by the first free end of the second measuring element 6. In the embodiment shown in the figures, the second portion 6b of the second measuring element 6 is formed in the region of the second free end of the second measuring element 6 or by the second free end of the second measuring element 6. The potential gradient formed between said portions 6a, 6b of the second measuring element 6 is typically independent of the filling level of the filling medium 2. The measuring region of the second measuring element 6 extends between the two portions 6a, 6b.

The second measuring element 6 is designed as a measuring resistor. Accordingly, the formation of the potential gradient between said portions 6a, 6b of the second measuring element 6 is based on the second measuring element 6 being designed as a measuring resistor. The resistance (value) of the measuring resistor is sufficiently large that a corresponding potential gradient is formed between said portions 6a, 6b of the second measuring element 6.

The measuring resistor can be designed as a resistance element that is arranged or formed so as to extend continuously along the longitudinal axis of the second measuring element 6, in particular on a substrate element 18, i.e. for example a circuit board of the second measuring element 6. An equivalent circuit diagram for the first measuring element 5 and a corresponding second measuring element 6 that is designed as a measuring resistor or resistance element constitutes an RC chain with an "infinite" number of RC elements.

As is clear from below, in connection with the embodiment shown in FIG. 5, it is alternatively also conceivable for the measuring resistor to be formed by a plurality of discrete, electrically conductive, in particular metal, surface elements $F_1$-$F_n$ that are arranged or formed along the longitudinal axis of the second measuring element 6 on a corresponding substrate element 18 of the second measuring element 6, and which surface elements are each connected to discrete resistance elements $R_1$-$R_n$. An equivalent circuit diagram for a first measuring element 5 and a correspondingly designed second measuring element 6 displays a plurality of discrete capacitive surfaces that are connected by means of electrical resistors.

Whatever the specific design, the measuring resistor, and thus the second measuring element 6, cam be formed by coating the substrate element 18 at least in portions, and possibly completely, with a suitable material, i.e. for example a metal. The coating 11 can extend continuously or discontinuously between said portions 6a, 6b of the second measuring element 6 (in the longitudinal direction of the second measuring element). The coating 11 can be achieved by means of various, in particular chemical and/or physical, deposition or application or coating techniques which allow for material application that forms a coating 11. In the embodiment shown in FIGS. 1 and 2, by way of example the coating 11 that forms the measuring resistor is applied to the substrate element 18 by means of printing technology, in particular screen printing technology.

In the embodiment shown in FIGS. 1 and 2, the second measuring element 6 additionally comprises an insulation coating 17, made of a suitable insulation material, such as plastics material, which forms an electrical insulation of the second measuring element 6. The second measuring element 6 is insulated from the filling medium 2 in this manner; i.e. there is no electrical contact between the filling medium 2 and the second measuring element 6.

The device 1 further comprises a voltage generation means 7 that is associated with the second measuring element 6, i.e. in particular electrically connected to the second measuring element 6. The voltage generation means 7 is designed to provide or generate a first electrical voltage $U_1$ and a second electrical voltage $U_2$, and apply these to the second measuring element 6. In order to provide or generate respective electrical voltages $U_1$, $U_2$, the voltage generation means 7 can be connected to an internal or external voltage (supply) source (not shown), i.e. for example a voltage supply network. The first electrical voltage $U_1$ can be the same as the second electrical voltage $U_2$. The first electrical voltage $U_1$ can, however, optionally also be different (in terms of magnitude) from the second electrical voltage $U_2$, or vice versa. Therefore, the voltage generation means 7 can optionally be designed to generate at least two identical or different electrical voltages $U_1$, $U_2$.

In order to apply respective first and second electrical voltages $U_1$, $U_2$ to the second measuring element 6, the second measuring element 6 comprises separate voltage application regions, i.e. for example electrical contacts, at which the electrical voltages $U_1$, $U_2$ provided or generated by the voltage generation means 7 can be or are applied. A first voltage application region is formed by or arranged in the region of the above-mentioned first portion 6a of the second measuring element 6, and a second voltage application region is formed by or arranged in the region of the above-mentioned second portion 6b of the second measuring element 6.

The electrical voltages $U_1$, $U_2$ provided or generated by the voltage generation means 7 can each be provided or generated in the form of a voltage pulse that is defined, in particular in terms of magnitude and time. Accordingly, the voltage generation means 7 can be designed for providing or generating defined voltage pulses. The correspondingly designed voltage generation means 7 can for example be designed as a pulse generator. A first voltage pulse can be the same as a second voltage pulse. A first electrical voltage pulse can, however, optionally also be different (in terms of magnitude) from a second electrical voltage pulse, or vice versa. Therefore, the voltage generation means 7 can optionally be designed to generate at least two identical or different electrical voltage pulses.

The device 1 furthermore comprises a control means 8 that is implemented as hardware and/or software and is associated with the voltage generation means 7. The control means 8 is designed to control the operation of the voltage generation means 7 such that the first and second electrical voltage $U_1$, $U_2$ is applied in an alternating manner to the second measuring element 6, i.e. to the first and second voltage application regions of the second measuring element 6. Alternating application or presence of the first and second electrical voltage $U_1$, $U_2$ on the second measuring element 6, i.e. the respective voltage application regions of the second measuring element 6, is in particular to be understood to mean that electrical voltages $U_1$, $U_2$ or voltage pulses that are defined (in terms of magnitude) are applied to respective voltage application regions of the second measuring element 6 in an alternating manner. In this case, as shown in FIG. 1, either the first voltage $U_1$ is applied to the first voltage application region of the second measuring element 6, while the second voltage $U_2$ is applied to the second voltage application region of the second measuring element 6, or, as shown in FIG. 2, the second voltage $U_2$ is applied to the first voltage application region of the second measuring element 6, while the first voltage $U_1$ is applied to the second voltage application region of the second measuring element 6.

The control means 8 is accordingly designed to control the operation of the voltage generation means 7 such that the first electrical voltage $U_1$ and the second electrical voltage $U_2$ are applied in an alternating manner to the second measuring element 6, i.e. to respective voltage application regions of the second measuring element 6. Accordingly, in a first time interval (cf. FIG. 1) the first electrical voltage $U_1$, and in a following second time interval (cf. FIG. 2) the second electrical voltage $U_2$ is applied to the first voltage application region of the second measuring element 6, while in the first time interval (cf. FIG. 1) the second electrical voltage $U_2$, and in the following second time interval (cf. FIG. 2) the first electrical voltage $U_1$ is applied to the second voltage application region of the second measuring element 6. In a following third time interval the first electrical voltage $U_1$ is again applied to the first voltage application region of the second measuring element 6, while the second electrical voltage $U_2$ is again applied to the second voltage application region of the second measuring element 6, and so on.

The principle for capacitive filling level measurement that can be implemented using the device 1 is based in particular on detection and evaluation of the electrical charge or electrical capacitance between the first and the second measuring element 5, 6, which varies depending on the filling level of the filling medium 2, from which measurement the filling level of the filling medium 2 can be concluded and this can thus be determined.

In this case, the second measuring element 6 typically functions as a filling level-independent voltage divider which generates a potential gradient along the second measuring element 6 or along the measuring region of the second measuring element 6. The filling level-independent voltage division along the second measuring element 6 or along the measuring region of the second measuring element 6 results in a filling level-dependent weighting of the electrical charge or capacitance between the first and the second measuring element 5, 6. Accordingly, the electrical charge between the first and the second measuring element 5, 6 is in particular dependent on the filling level of the filling medium 2, the potential along the potential gradient, and the permittivity of the filling medium 2 which, however, is not relevant, and can therefore be disregarded, for the determination of the filling level that can be performed using the device 1. Accordingly, the determination of the filling level that can be performed using the device 1 is possible independently of the permittivity of the filling medium 2.

The device 1 furthermore comprises a measuring device 9 that is implemented as hardware and/or software. The measuring device 9 is designed for measuring the, possibly changing, electrical charge or electrical capacitance between the first and second measuring element 5, 6 during the alternating application or presence of the first and second electrical voltage $U_1$, $U_2$ on the voltage application regions of the second measuring element 6. The measuring device 9 is thus designed to measure a first electrical charge between the first and second measuring element 5, 6 during application of the first electrical voltage $U_1$ to the first voltage application region of the second measuring element 6 and while the second electrical voltage $U_2$ is applied to the second voltage application region of the second measuring element 6, and to measure a second electrical charge between the first and second measuring element 5, 6 during application of the second electrical voltage $U_2$ to the first voltage application region of the second measuring element 6 and during application of the first electrical voltage $U_1$ to the second voltage application region of the second measuring element 6.

The measuring device 9 is furthermore designed for generating a measuring signal that describes the measured charge between the first and the second measuring element 5, 6 during the alternating application or presence of the first and second electrical voltage $U_1$, $U_2$ on the voltage application regions of the second measuring element 6. The measuring signal can contain at least two partial signals, wherein a first partial signal describes the electrical charge between the first and second measuring element 5, 6 during application of the first electrical voltage $U_1$ to the first voltage application region of the second measuring element 6 and during application of the second electrical voltage $U_2$ to the second voltage application region of the second measuring element 6, and a second partial signal describes the electrical charge between the first and second measuring element 5, 6 during application of the second electrical voltage $U_2$ to the first voltage application region of the second measuring element 6 and application of the first electrical voltage $U_1$ to the second voltage application region of the second measuring element 6.

The measuring device 9 is associated with an evaluation device 10 that is implemented as hardware and/or software. The evaluation device 10 is designed for evaluating the measured charge during the alternating application or presence of the first and second electrical voltage $U_1$, $U_2$ on the second measuring element 6, i.e. in particular on the respective voltage application regions of the second measuring element 6, or for evaluating said measuring signal in view of the filling level of the filling medium 2 in the filling volume 3. In order to evaluate the measured charge or the measuring signal, the evaluation device 10 can comprise suitable evaluation logics or suitable evaluation algorithms.

FIGS. 1 and 2 furthermore show a measuring assembly 12 for capacitive measurement of a filling level of a filling medium 2 in a filling volume 3 that can be filled with a filling medium 2. The measuring assembly 12 comprises the second measuring element 6, the measuring element 6 forming the device 1, the voltage generation means 7 associated with the second measuring element 6, the control means 8, the measuring device 9, and the evaluation device 10.

As indicated by the box 13 shown in dashed lines, individual ones, a plurality, or all of the parts of the measuring assembly 12 can be combined, structurally, to form an assembly that can be handled separately, i.e. for example arranged or formed on or in a housing body (not shown) of the measuring assembly 12.

Figure 3:
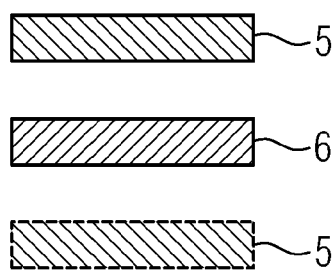

In the embodiment shown in FIGS. 1 and 2, the first measuring element 5 and the second measuring element 6 are designed in a plate-like or planar manner in each case. FIG. 3 is a cross-sectional view of the measuring elements 5, 6 or the arrangement thereof, in a schematic view of an embodiment of a corresponding capacitor assembly 16. Since it is optional, the first measuring element 5, which is at the bottom in FIG. 3, is shown in dashed lines.

Figure 4:
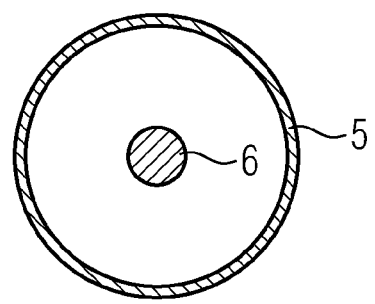
Figure 5:
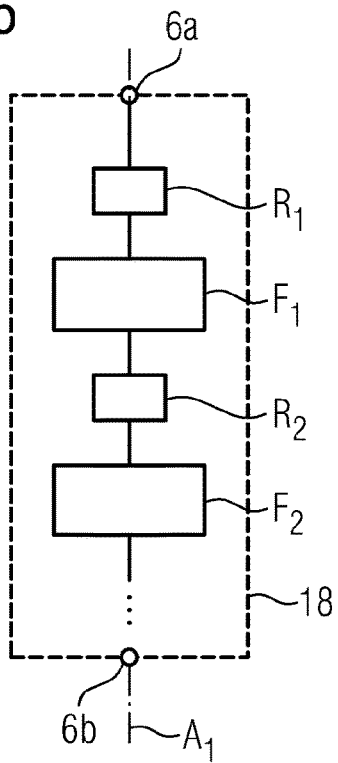
Figure 6:
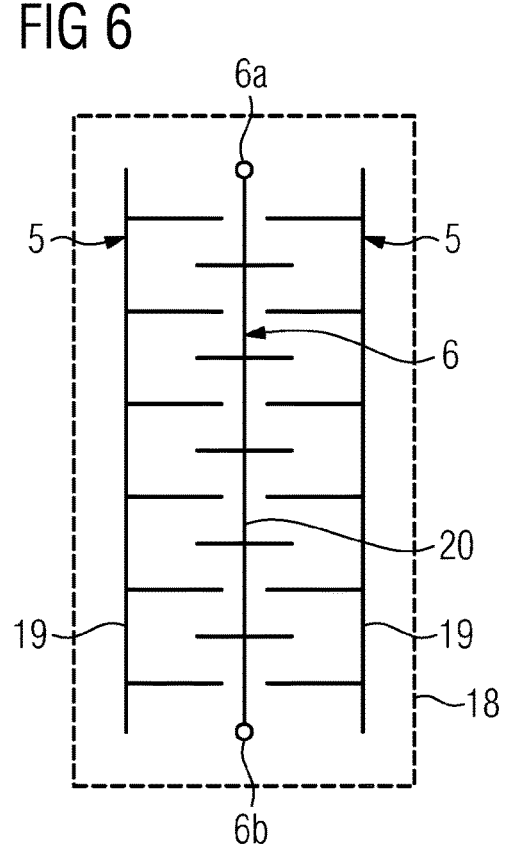

FIG. 4-6 show further embodiments of first and second measuring elements 5, 6 or capacitor assemblies 16 formed thereby:

FIG. 4 is in turn a cross-sectional view, for example of a coaxial arrangement of the measuring elements 5, 6. The coaxial arrangement of the measuring elements 5, 6 results from a tube-like or tubular design of the first measuring element 5, and a rod-shaped or rod-like design of the second measuring element 6.

FIG. 5 (already mentioned) is a purely schematic view of the formation of the second measuring element 6 by a plurality of discrete, electrically conductive, in particular metal, surface elements $F_1$-$F_n$ that are arranged or formed along the longitudinal axis A1 of the second measuring element 6 on a corresponding substrate element 18 of the second measuring element 6, and which surface elements are each connected to discrete resistance elements $R_1$-$R_n$. It is clear that an alternating arrangement consisting of corresponding surface elements $F_1$-$F_n$ and resistance elements $R_1$-$R_n$ results. It is accordingly visible, in FIG. 5, that the second measuring element 6 can also be designed so as to be segmented, i.e. can comprise a plurality of measuring element segments, specifically in the form of corresponding surface elements $F_1$-$F_n$ and resistance elements $R_1$-$R_n$, that form the second measuring element 6.

It is clear from the embodiment shown in FIG. 6, which is a plan view of a capacitor assembly 16, that the measuring elements 5, 6 can also be formed by specified more or less electrically conductive structures, on a substrate element 18 such as a circuit board. Electrically conductive structures (first electrically conductive structures 19) having higher electrical conductivity form the first measuring element 5, and electrically conductive structures (second electrically conductive structures 20) having a comparatively (significantly) lower electrical conductivity form the second measuring element 6. In this connection, what is known as an interdigital arrangement or structure is shown in FIG. 6. Accordingly, respective first and second electrically conductive structures 19, 20 are designed so as to be arranged in a manner so as to be mutually offset, in parallel, so as to engage in one another in a finger-like manner. In this case, the arrangement of respective first and second electrically conductive structures 19, 20 is selected such that respective first electrically conductive structures 19 are arranged or designed so as to engage in two gaps that are formed between two (directly) adjacent second electrically conductive structures 20, at least in regions.

A method for capacitive measurement of a filling level of a filling medium 2 in a filling volume 3 that can be or is filled with a filling medium 2 can be implemented using the device 1 or the measuring assembly 12 shown in the figures.

The method comprises in particular the following steps:
providing a first measuring element 5,
providing a second measuring element 6, wherein the second measuring element 6 is created such that a potential gradient forms between a first portion 6a of the second measuring element 6, and a second portion 6b of the second measuring element 6;
providing or generating a first electrical voltage $U_1$ and a second electrical voltage $U_2$ that is optionally different from the first electrical voltage $U_1$;
applying the generated first and second electrical voltage $U_1$, $U_2$ alternately to the first and second portion 6a, 6b of the second measuring element 6,
measuring the charge between the first and second measuring element 5, 6 during the alternating application or presence of the first and second electrical voltage $U_1$, $U_2$ on the second measuring element 6,
evaluating the measured charges during the alternating application or presence of the first and second electrical voltage $U_1$, $U_2$ on the second measuring element 6, in view of the filling level of the filling medium 2 in the filling volume 3.

The invention claimed is:

1. Device for capacitive measurement of a filling level of a filling medium in a filling volume that can be filled with a filling medium, comprising:
   a first measuring element;
   a second measuring element, wherein the second measuring element is created such that a potential gradient can be formed between a first portion of the second measuring element, and a second portion of the second measuring element;
   a voltage generation means that is associated with the second measuring element and is configured to generate a first electrical voltage and a second electrical voltage that is optionally different from the first electrical voltage, and to apply the first electrical voltage and the second electrical voltage to the second measuring element; and
   a control means that is associated with the voltage generation means and is configured to control the operation of the voltage generation means such that the first and second electrical voltage is applied in an alternating manner to the first and the second portion of the second measuring element; wherein
   the control means is configured to control operation of the voltage generation means to apply the first electrical voltage to the first portion while the second electrical voltage is applied to the second portion in a first time interval, and to control operation of the voltage generation means to apply the first electrical voltage to the second portion while the second electrical voltage is applied to the first portion in a second time interval.

2. Device according to claim 1, further comprising a measuring device that is configured for measuring the electrical charge between the first and second measuring element during the alternating application of the first and second electrical voltage to the first and second portion of the second measuring element.

3. Device according to claim 2, further comprising an evaluation device that is associated with the measuring device and is configured for evaluating the measured electrical charge during the alternating application of the first and second electrical voltage to the first and second portion of the second measuring element, to determine the filling level of the filling medium in the filling volume.

4. Device according to claim 1, wherein the first measuring element and the second measuring element are arranged side-by-side, and wherein the first measuring element and the second measuring element form a capacitor assembly.

5. Device according to claim 1, wherein the first measuring element is configured so as to be plate-like or planar, or tube-like or tubular, and the second measuring element is configured so as to be plate-like or planar, or rod-like or rod-shaped.

6. Device according to claim 1, wherein the second measuring element is configured as a measuring resistor or comprises at least one such resistor.

7. Device according to claim 6, wherein the measuring resistor is configured as a resistance element that is arranged or formed so as to extend continuously along a longitudinal axis of the second measuring element.

8. Device according to claim 6, wherein the measuring resistor is formed by a plurality of discrete resistance elements that are arranged or formed along a longitudinal axis of the second measuring element, on a substrate element of the second measuring element.

9. Device according to claim 1, wherein the second measuring element comprises, at least in portions an insulation coating, made of an insulation material, which forms an electrical insulation of the second measuring element.

10. Device according to claim 1, wherein the first portion of the second measuring element is formed in a region of a first free end of the second measuring element or by a first free end of the second measuring element, and the second portion of the second measuring element is formed in a region of a second free end of the second measuring element or by a second free end of the second measuring element.

11. Device according to claim 1, wherein a first voltage application region of the second measuring element is formed by or in the region of the first portion of the second measuring element, and a second voltage application region of the second measuring element is formed by or in the region of the second portion of the second measuring element.

12. Measuring assembly for capacitive measurement of a filling level of a filling medium in a filling volume that can be filled with a filling medium, comprising:
    a measuring element, wherein the measuring element is created such that a potential gradient can be formed between a first portion of the measuring element and a second portion of the measuring element;
    a voltage generation means that is associated with the measuring element and is configured to generate a first electrical voltage and a second electrical voltage that is optionally different from the first electrical voltage, and to apply the first electrical voltage and the second electrical voltage to the measuring element; and
    a control means that is associated with the voltage generation means and is configured to control the operation of the voltage generation means such that the first and second electrical voltage is applied in an alternating manner to the first and second portion of the measuring element; wherein the control means is configured to control operation of the voltage generation means to apply the first electrical voltage to the first portion while the second electrical voltage is applied to the second portion in a first time interval, and to control operation of the voltage generation means to apply the first electrical voltage to the second portion while the second electrical voltage is applied to the first portion in a second time interval.

13. Method for capacitive measurement of a filling level of a filling medium in a filling volume that can be filled with a filling medium, comprising the steps of:

providing a first measuring element, providing a second measuring element, wherein the second measuring element is created such that a potential gradient can be formed between a first portion of the second measuring element, and a second portion of the second measuring element;

providing or generating a first electrical voltage and a second electrical voltage that is optionally different from the first electrical voltage;

applying the generated first and second electrical voltage alternately to the first and second portion of the second measuring element;

measuring the electrical charge between the first and second measuring element during the alternating application or presence of the first and second electrical voltage on the second measuring element; and evaluating the measured charges during the alternating application or presence of the first and second electrical voltage on the second measuring element to determine the filling level of the filling medium in the filling volume, wherein applying the generated first and second electrical voltage alternately to the first and second portion of the second measuring element comprises applying the first electrical voltage to the first portion while the second electrical voltage is applied to the second portion in a first time interval, and applying the first electrical voltage to the second portion while the second electrical voltage is applied to the first portion in a second time interval.

* * * * *